US 6,751,219 B1

(12) United States Patent
Lipp et al.

(10) Patent No.: US 6,751,219 B1
(45) Date of Patent: Jun. 15, 2004

(54) MULTICAST PACKET DUPLICATION AT RANDOM NODE OR AT EGRESS PORT WITH FRAME SYNCHRONIZATION

(75) Inventors: Robert J. Lipp, Los Gatos, CA (US); Younes Boura, Santa Clara, CA (US)

(73) Assignee: Aztech Partners, Inc., Plano, TX (US)

( * ) Notice: Subject to any disclaimer, the term of this patent is extended or adjusted under 35 U.S.C. 154(b) by 0 days.

(21) Appl. No.: 09/553,500

(22) Filed: Apr. 20, 2000

(51) Int. Cl.[7] .................................................. H04J 15/00
(52) U.S. Cl. ....................................... 370/390; 370/406
(58) Field of Search ................................. 370/270, 356, 370/390, 392, 395.51, 400, 406, 408

(56) References Cited

U.S. PATENT DOCUMENTS

| | | | |
|---|---|---|---|
| 5,142,529 A | | 8/1992 | Parruck et al. ............... 370/84 |
| 5,305,311 A | * | 4/1994 | Lyles .......................... 370/390 |
| 5,335,223 A | | 8/1994 | Iino ........................... 370/65.5 |
| 5,390,180 A | | 2/1995 | Reilly ........................... 370/84 |
| 5,436,893 A | | 7/1995 | Barnett ........................ 370/60.1 |
| 5,471,476 A | | 11/1995 | Hiramoto .................. 370/105.1 |
| 5,517,494 A | | 5/1996 | Green ......................... 370/60 S |
| 5,610,905 A | | 3/1997 | Murthy et al. ............... 370/401 |
| 5,717,693 A | | 2/1998 | Baydar et al. ............... 370/514 |
| 5,809,032 A | | 9/1998 | Weeber et al. ............... 370/517 |
| 5,812,290 A | | 9/1998 | Maeno et al. ................ 359/117 |
| 5,898,686 A | | 4/1999 | Virgile ........................ 370/381 |
| 5,930,248 A | | 7/1999 | Langlet et al. ............... 370/347 |
| 5,959,989 A | | 9/1999 | Gleeson et al. .............. 370/390 |
| 5,991,297 A | | 11/1999 | Palnati et al. ................ 370/389 |
| 6,128,305 A | * | 10/2000 | Hjalmtysson et al. ........ 370/410 |
| 6,415,312 B1 | * | 7/2002 | Boivie ......................... 370/400 |
| 6,594,261 B1 | * | 7/2003 | Boura et al. ................. 370/389 |

* cited by examiner

Primary Examiner—Huy D. Vu
Assistant Examiner—Justin M Philpott
(74) Attorney, Agent, or Firm—Stuart T. Auvinen

(57) ABSTRACT

Multicast is performed in a packet-based network switch having a switch fabric of store-and-forward switch nodes. Congestion and blocking at an ingress port is avoided because packet replication is performed at random nodes dispersed throughout the switch fabric. Each multicast packet inserted into the switch fabric by the ingress port is sent to a randomly-selected node. The random node replicates the multicast packet into many unicast packets that are routed to egress ports. A SONET frame can be divided into several multicast packets that are dispersed to different random nodes before replication, thus dispersing congestion. Replication can be delayed until the next SONET frame to prevent latency build up from propagation delays in the switch fabric. Alternately, the SONET payload envelope pointer can be advanced by the propagation delay. Lookup tables at the random nodes can include a list of destinations so that all the destination addresses do not have to be stored in each multicast packet header.

17 Claims, 7 Drawing Sheets

TI = TA + 125 uS

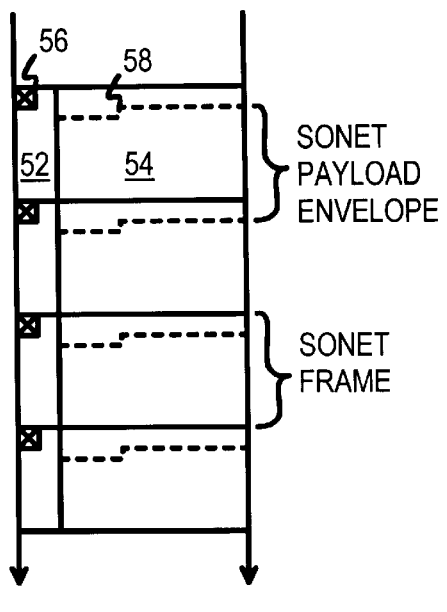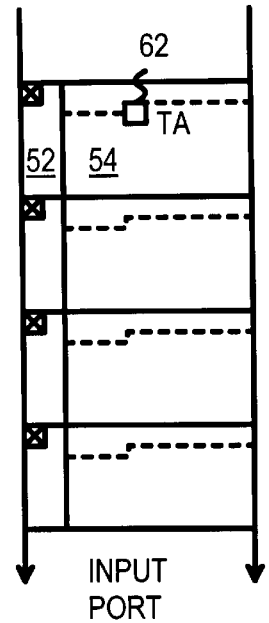
FIG. 5A  FIG. 5B
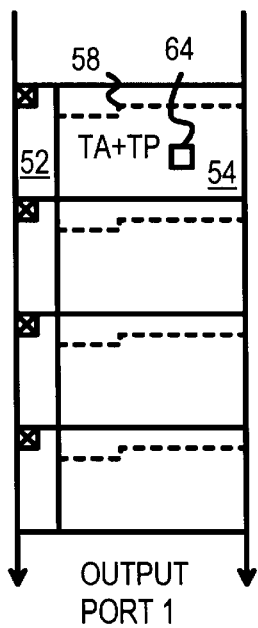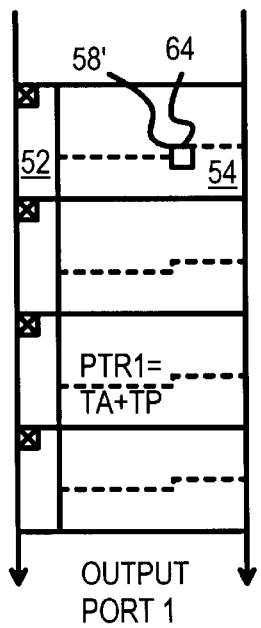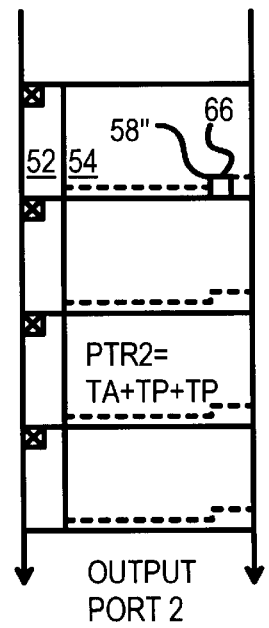
FIG. 5C  FIG. 5D  FIG. 5E

MULTICAST PACKET DUPLICATION AT RANDOM NODE OR AT EGRESS PORT WITH FRAME SYNCHRONIZATION

FIELD OF THE INVENTION

This invention relates to network systems, and more particularly to multicast of packets in a mesh-based packet switch.

BACKGROUND OF THE INVENTION

Ever-increasing demand for telephone and data communications has led to the development of higher-capacity media such as fiber optic cables. Standards have been developed to aggregate many separate telephone calls (DS0 lines) onto high-speed data backbones. One widely-used optical standard originally developed to aggregate phone calls is the Synchronous Optical NETwork (SONET) standard.

Traditional telephone switches for SONET have included Time-Division-Multiplexed (TDM) circuit switches. More recently, packet-based switches have been used to emulate such TDM switches. See the related application for "Adaptive Fault-Tolerant Switching Network With Random Initial Routing and Random Routing Around Faults", U.S. Ser. No. 09/470,144, assigned to Corvia Networks of Sunnyvale, Calif., which solves the problem of packet blocking and localized congestion by initially routing packets to a randomly-selected node within the network fabric. SONET data received by a switch is divided into packets which are sent through the switch fabric to the output (egress) port. At the egress port, the packets are re-assembled in order to form the outgoing SONET data. The switch fabric consists of store-and-forward nodes that receive packets and send them toward their destination, the egress port. The nodes are connected together in a mesh to provide many alternate routes, ensuring that node failures can be routed around.

SONET data is arranged into frames that are sent every 125 micro-seconds ($\mu$sec). Since one SONET frame is divided into several packets that may be sent through the switch fabric over different routes, the latency through the switch can vary. Routing algorithms used by the nodes must be carefully selected to ensure that statistically such latencies do not exceed the frame latency of 125 $\mu$sec.

While most network traffic is point-to-point (unicast), some special applications require multicast functionality. For example, video distribution requires that the packets containing the video data be replicated and sent to several different users, often through different egress ports. Other applications that use multicast include port monitoring or mirroring, protection-path routing, in-service rollover, and drop-and-continue. Port mirroring/monitoring is used for diagnostic purposes, to observe the data at another port without interfering with its forwarding. Protection-path routing is used to send duplicate data over an alternative route for enhanced reliability. In-service rollover is temporarily routing data over a duplicate new path to its destination in preparation for a permanent switchover to the new path. Drop-and-continue is a method of multicasting over a continuing network interconnection such as a ring where the data is dropped off at an intermediate node but also continues to another destination.

Parallel Multicast Causes Congestion—FIG. 1

FIG. 1 shows multicast by replicating a packet at an ingress port. One simple approach to implement multicast is to replicate packets as they are inserted into the switch fabric at the input (ingress) port. Packet 12 is a packet received by the network switch and inserted into the switch fabric by ingress port 10. Ingress port 10 formats packet 12 for transmission through switch fabric 28, and makes several duplicate copies 14 of the re-formatted packet 12.

Each of the duplicate copies 14 contains a destination address for a different egress port 20–25. Thus the duplicate copies 14 are not exact duplicates, but do contain the same data payload as packet 12. Of course, packet 12 can itself be a portion of a larger data group, such as a row in a SONET frame. Each of the duplicate copies 14 is routed toward its destination egress port 20–25 over a different path through switch fabric 28. For example, one of the duplicate copies 14 is routed from ingress port 10 through nodes 30, 31, 32 to egress port 25, while another of the duplicate copies 14 is routed from ingress port 10 through node 35 to egress port 24. Other routes include node 33 to egress port 20, node 34 to egress port 21, and node 35 to egress ports 22, 23.

Egress ports 20–25 each receive one of the duplicate copies 14 and generate packet 16 containing the same data as packet 12. One packet 12 input to ingress port 10 is used to generate six packets 16 to six egress ports 20–25. This is known as parallel multicast, since the duplicate copies 14 pass through switch fabric 28 in parallel to each other, at about the same time.

While such parallel multicast is useful, replication of the packet at the ingress port causes a multiplication of packet traffic within switch fabric 28. In this example, six times the traffic of a single packet is produced at node 10 and at neighboring nodes creating a routing "hot spot" of congestion. Such heavy traffic can slow the switch since several nodes must route the additional packet traffic. Other packets passing through switch fabric 28 from other ingress ports 18 can be slowed by the multicast traffic. Failures such as dropped packets can occur when packets are delayed.

Some nodes in switch fabric 28 can become congested from the multicast traffic. For example, node 35 receives three of the duplicate copies 14 from ingress port 10. Node 35 can become congested by the sudden arrival of several multicast packets. Ingress port 10 may also be locally congested, having to transmit all the duplicate copies 14.

Serial Multicast Increases Latency—FIG. 2

FIG. 2 shows serial multicast by packet duplication at egress ports. Traffic from multicast can be reduced by using a serial or drop-and-continue method. Packet 12 received by ingress port 10 is not duplicated. Instead, packet 12 is sent to egress port 20 through node 33 in switch fabric 28. Once packet 12 arrives at its first destination, egress port 20, packet 12 is replicated to form packet 16 in addition to packet 12. Packet 16 is output from switch fabric 28 by egress port 20, while packet 12 is re-injected into switch fabric 28. Packet 12 then continues on to its second destination, egress port 21. Another duplicate packet 16 is made by egress port 21 for output, while packet 12 continues to the third destination, egress port 22.

A duplicate of packet 12 is made for output as packet 16 passes through each egress port 20–23. Once packet 12 arrives at its final destination, egress port 24, it is removed from switch fabric 28 and output as packet 16 by egress port 24.

Such serial multicast results in five copies of packet 12 being transmitted from egress ports 20–24 with minimal traffic increase. Local congestion from many duplicate copies of the multicast packet are avoided.

Latency Delays Packets into Next SONET Frame—
FIG. 3

One problem with the serial multicast of FIG. 2 is latency. FIG. 3 shows serial multicast packets in SONET time frames. A delay occurs for each packet as it travels through the switch fabric. Also, a delay occurs while each egress port replicates the packet and re-injects it into the switch fabric. Since delays are cumulative, the last egress ports 23, 24 experience greater delays than do earlier egress ports 20–22.

Packet 12 arrives at ingress port 10 of FIG. 2 at arrival time TA shown on FIG. 3. Arrival time TA occurs near the beginning of a first SONET frame. After a first propagation delay TP, the packet arrives at the first egress port. The first packet is output at time TA+TP. The packet is duplicated and sent from the first egress port to the second egress port 21, which requires another propagation delay TP. Thus the second egress port outputs its packet at time TA+TP+TP. This is still within the first SONET frame.

The second egress port duplicates the packet and sends it to the third egress port, requiring another propagation delay of TP. This third egress port can output its packet at TA+TP+TP+TP. However, since a new SONET frame is marked by a synch pulse every 125 μsec, this third egress port outputs its packet in the next SONET frame.

The propagation delays are not fixed, but vary with the actual path taken by the packet. Congestion at an egress port can also delay packet replication, further adding to delays. Thus each TP delay is not fixed but can vary. The second egress port's packet may actually be transmitted during the next SONET frame rather than the current frame, depending on the actual delays. This creates synchronization problems since the packets from later egress ports may not be available in the current SONET frame. The variability of delays further complicates the problem. An error or loss of data can occur.

Fault tolerance is also a problem with serial multicast. If the packet passes through a faulty node or egress port, the packet can be lost. Downstream egress ports then do not receive the multicast packet.

What is desired is an improved multicast of packets in a packet-based switch. Accommodation of latency and variable propagation delays for serial multicast is desired. Reduced congestion and traffic for parallel multicast is also desired. Multicast for a mesh-based switch that emulates a SONET switch is desired. Avoidance of blocking and packet loss from congestion during multicast is desirable. Fault tolerance during serial multicast is desired.

SUMMARY OF THE INVENTION

A mesh-based packet switch with multicast capability has a plurality of ingress ports for receiving data and generating packets including multicast packets. A plurality of egress ports are for transmitting data from the packet switch. A switch fabric has a plurality of switching nodes each for storing and forwarding packets within the switch fabric. The switching nodes include input nodes coupled to ingress ports in the plurality of ingress ports and output nodes coupled to egress ports in the plurality of egress ports.

An ingress port injecting a multicast packet generates a multicast header to attach to the multicast packet. The multicast header includes:
  a multicast flag that indicates that the multicast packet is a packet being sent to many egress ports;
  a random field that stores an address of a random node within the switch fabric; and
  a multicast destination identifier that indicates which egress ports to send the multicast packet to.

The multicast packet is initially routed to the random node before packet replication. The random node stores the multicast packet sent from the ingress port. The random node replicates the multicast packet to generate a plurality of unicast packets. The unicast packets each have a header that includes:
  a destination field that stores a destination address of an output node coupled to an egress port identified by the multicast destination identifier of the multicast packet received by the random node.

The switching nodes route the unicast packets from the random node to the output nodes identified by the destination fields of the unicast packets generated by the random node. Thus congestion at the input node is reduced by replicating the multicast packet at the random node.

In further aspects the random node is selected at random from all the switching nodes in the switch fabric. Thus multicast packets are initially dispersed to randomly-selected nodes within the switch fabric before packet replication.

In still further aspects the random node has a lookup table that is indexed by the multicast destination identifier from the multicast packet. It stores the destination addresses written to the headers of the unicast packets generated by the random node. Thus destination addresses for the multicast packet from the ingress port are locally stored at the random node.

In other aspects the lookup table further stores second-level multicast identifiers. The second-level multicast identifiers are for indexing the lookup table to locate a second group of destination addresses. The random node further generates a second multicast packet with a second multicast header that includes a second random field storing an address of a second random node within the switch fabric. The second multicast header stores a second-level multicast identifier from the lookup table.

The second multicast packet is routed from the random node to the second random node by switching nodes in the switch fabric. The second random node replicates the second multicast packet to generate unicast packets. The unicast packets each have a header including a destination field read from a second lookup table at the second random node. Thus nested packet replication occurs at two random nodes.

In further aspects data received by the ingress port is arranged in a Synchronous Optical NETwork (SONET) frame. Packet replication by the random node and by the second random node is synchronized to the SONET frame.

In other aspects of the invention the ingress port injects a serial multicast packet into the switch fabric. The serial multicast packet has a serial header attached to the serial multicast packet by the ingress port. The serial header includes:
  a multicast flag which indicates that the multicast packet is a packet being sent to many egress ports; and
  a multicast destination identifier that indicates which egress ports to send the multicast packet to.

The serial multicast packet is routed by the switching nodes to a first egress port indicated by the multicast destination identifier. The first egress port replicates and outputs data from within the serial multicast packet. The first egress port sends the serial multicast packet to a second egress port indicated by the multicast destination identifier.

The second egress port replicates and outputs data from within the serial multicast packet. The second egress port sends the serial multicast packet to a third egress port indicated by the multicast destination identifier. The third egress port replicates and outputs data from within the serial multicast packet. Routing to each next port is timed synchronously to the SONET frame. Thus serial multicast packets are routed to a chain of egress ports for replication at the egress ports without risk of a timing or SONET framing failure due to the combined latency of routing to multiple ports within a single SONET frame.

BRIEF DESCRIPTION OF THE DRAWINGS

FIG. 5A shows a floating payload envelope in a SONET frame.

FIGS. 5B–E show Synchronous Payload Envelope (SPE) pointer advancement for serial multicast packets.

DETAILED DESCRIPTION

Figure 1:
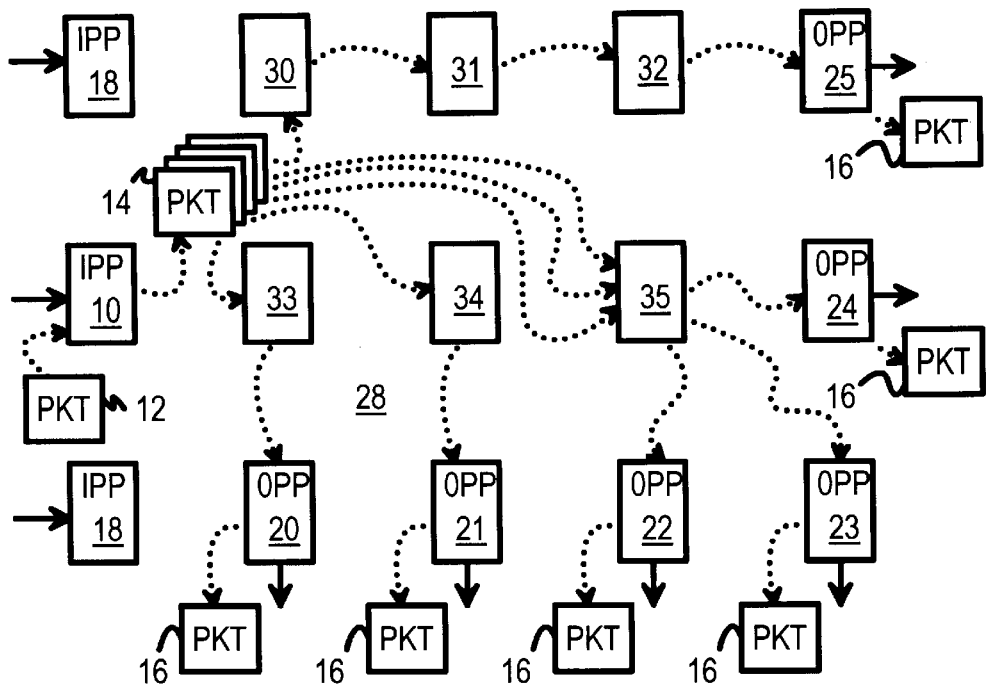
FIG. 1 shows multicast by replicating a packet at an ingress port.
Figure 2:
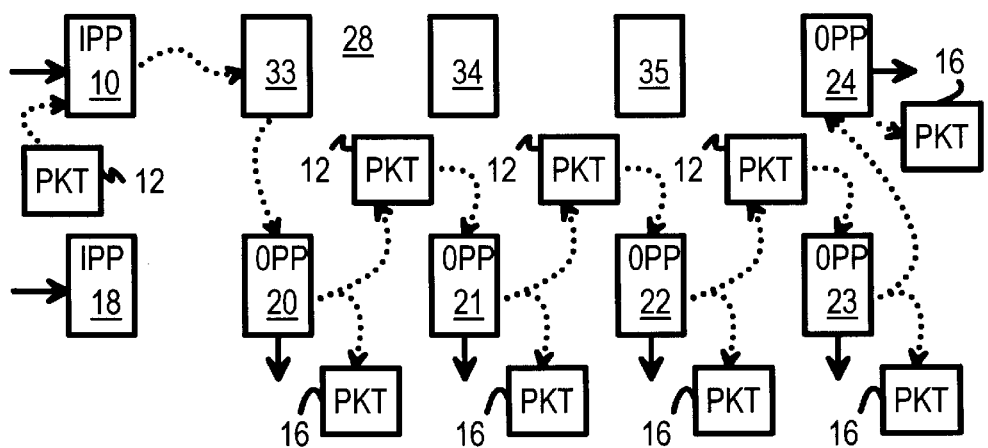
FIG. 2 shows serial multicast by packet duplication at egress ports.
Figure 3:
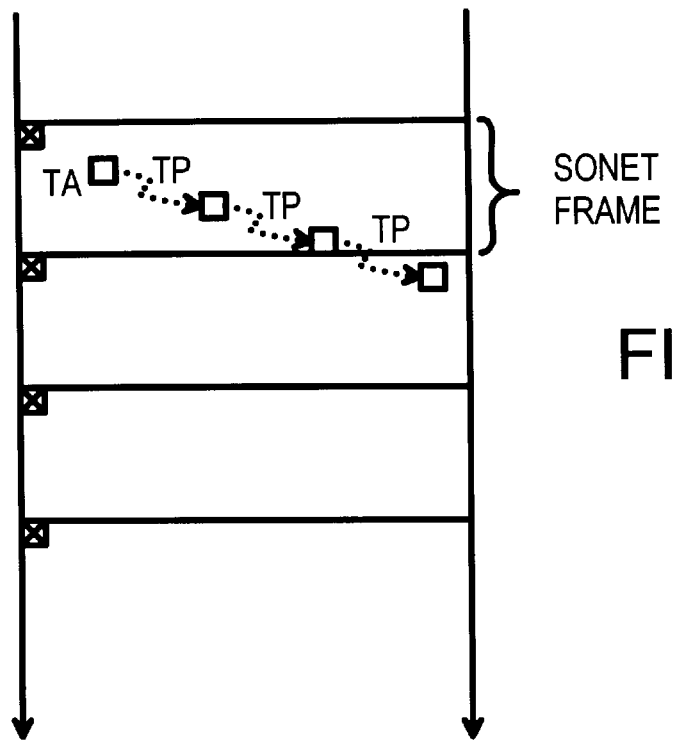
FIG. 3 shows serial multicast packets in SONET time frames.

The present invention relates to an improvement in network multicasting. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that multicast can be implemented in a mesh-based switch fabric using either serial or parallel multicast packet routing. For serial multicast, the problem of uncontrolled packet latency is eliminated by carefully matching delays to the SONET frame timing. Packets are held at each egress port and not duplicated until a reference time point in a next SONET frame. Thus only one packet replication is performed per SONET frame. This allows a propagation and replication delay of up to one SONET frame period (125 $\mu$sec). Using this method, serial multicast drops the multicast packet off at one egress port for each SONET frame until the multicast packet has reached all target egress ports.

This method adds one frame period (125 $\mu$sec) of latency for each egress port. When reduced latency is desired, a variation of this serial multicast method can be used. In the variation, a replicated packet is re-inserted by an egress port at a fixed offset time. The fixed offset time is added to the SONET data pointer to delay the start of the data envelope by an amount equal to the fixed offset time. Thus successive egress ports have larger SONET pointer offsets. When the pointer crosses over to the next SONET frame, the multicast packet is sent with the next SONET frame and the pointer reduced by the frame period of 125 $\mu$sec.

For parallel multicast, packet replication is not performed at the ingress port. Instead, a single multicast packet is sent to a random node within the switch fabric. At the random node, the multicast packet is replicated to form many duplicate copies of the packet. The duplicate copies of the multicast packet are then sent to their destinations, the egress ports.

Congestion at the ingress port is eliminated, since packet replication occurs at the random node, not at the ingress port. When several multicast packets are sent from the same ingress port, these packets are sent to different random nodes before replication. Thus packet duplication is randomly spread out within the switch fabric to several random nodes.

The multicast packet header may contain a list of all egress port destinations. However, when the multicast packet is sent to many egress ports, the header size increases beyond a reasonable amount. Rather than store all egress-port addresses, the header may include an identifier for a multicast domain. The random node then uses this domain identifier to look up a list of the egress-port addresses in a local table at the random node. Separate packets are then replicated for each of the egress port addresses in the multicast domain stored in the table.

Multicast domains may be nested, and replication can take place over several random nodes rather than just at a single node. This further reduces congestion since packet replication is spread over more intermediate nodes. Combinations of serial and parallel multicast are also contemplated, such as a serial drop-and continue to random nodes, and packet replication at the random nodes.

Figure 4:
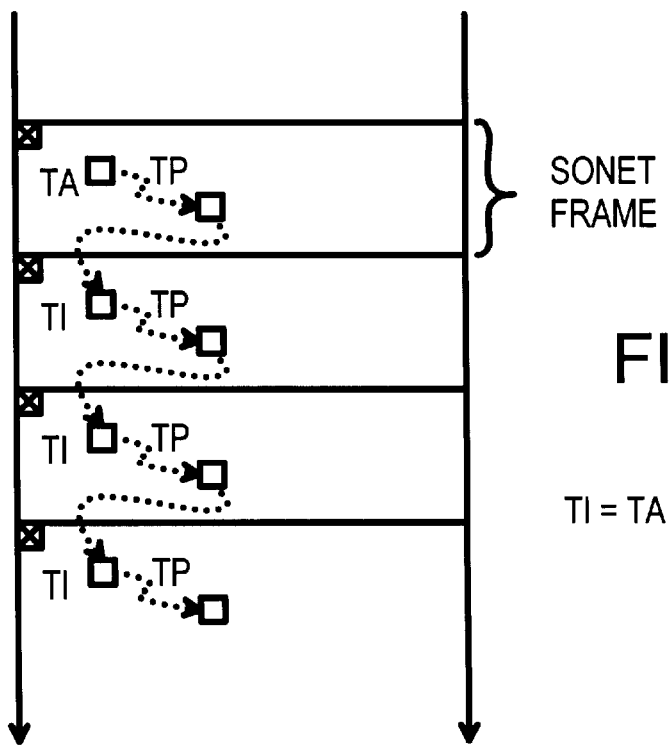
FIG. 4 shows serial multicast with packet re-insertion at a fixed time relative to SONET frames.

Fixed Insert Time Synched to SONET Frame—
FIG. 4

FIG. 4 shows serial multicast with packet re-insertion at a fixed time relative to SONET frames. A single multicast packet is sent in a chain to all target egress ports in a drop-and-continue fashion with packet duplication at each egress port.

Each SONET frame begins with a SONET sync pulse, indicated by the boxed "X" at the start of each frame in FIG. 4. The multicast packet is inserted into the switch fabric by the ingress port at arrival time TA. After a propagation delay TP, the packet arrives at the first egress port, at time TA+TP. This propagation time TP varies, but in the graph represents a statistical worst-case propagation through the switch fabric.

The packet is replicated by the first egress port to generate two packets. One packet is sent out the first egress port. Another packet is sent to the second egress port. This packet is not immediately re-inserted into the switch fabric. Instead, the first egress port holds the packet until a fixed time in the next SONET frame. The first egress port releases the replicated multicast packet back into the switch fabric at insertion time TI in the next SONET frame. In one embodiment, TI is the arrival time TA delayed by one frame period, or TA+125 μsec. The insertion time TI could also be simply the start of the next SONET frame's data payload, or some fixed delay after the start of the next SONET frame.

The re-inserted multicast packet re-inserted at time TI of the second frame then travels from the first egress port to the second egress port. This requires a propagation time TP, so that the duplicated packet arrives at the second egress port at time TI+TP during the second SONET frame. The second egress port replicates the packet and outputs a copy of the packet over its output port to an external network. However, the replicated multicast packet is held by the second egress port and not re-inserted until insertion time TI of the next (third) frame.

Each successive egress port holds the multicast packet until insertion time TI of the next SONET frame. Thus the multicast packet has almost a whole SONET frame period to propagate to the next egress port. The latency is essentially reset after each egress port. Latency errors are eliminated or greatly reduced.

Floating Payload Envelope in SONET Frame—FIG. 5A

FIG. 5A shows a floating payload envelope in a SONET frame. Each SONET frame begins with a sync pulse 56. Each SONET frame has an overhead portion 52 and a data payload portion 54. Data payload portion 54 and overhead portion 52 together contain 810 data bytes divided into 9 rows of 90 bytes in each row. In a preferred embodiment, the ingress port divides the received SONET frame into 9 packets, one packet for each row. The packets transmitted through the switch fabric are thus one row of a SONET frame.

Overhead portion 52 includes a data pointer that points to the first data byte in the Synchronous Payload Envelope (SPE). The first data byte 58 does not have to be at the start of the frame, or the first byte on the first row of data payload portion 54. Instead, the start of the data can float within a frame. The actual data for the SPE starts with first data byte 58 in the current frame, and extends across the frame boundary into the next SONET frame, and ends before first data byte 58 in the next frame. The data bounded by bytes 58 is known as a Synchronous Payload Envelope (SPE). The SPE thus floats relative to the SONET frame boundary. The phase of the SPE is indicated by the pointer in overhead portion 52 of the SONET frame.

SPE Pointer Adjusted—FIGS. 5B–E

In FIG. 5B, the ingress port receives a SONET frame with an SPE set at time TA in the frame relative to the sync pulse. The ingress port inserts a multicast packet 62 into the switch fabric.

After a propagation delay TP, the multicast packet arrives at the first egress port. In FIG. 5C, the serial multicast packet 64 arrives at the first egress port with an offset of TP from first data byte 58 time TA of the SPE. However, serial multicast packet 64 still arrives within the first SONET frame.

The first egress port replicates the multicast packet and outputs a copy with an offset of TP. The replicated packet is immediately re-inserted into the switch fabric. The SPE pointer for this packet's frame is increased by TP to account for the additional propagation delay through the switch fabric, as shown in FIG. 5D. The adjusted pointer PTR1 points to time TA+TP, which is first data byte 58' of the SONET frame for this first egress port.

In FIG. 5E, the packet arrives at the second egress port. The packet is replicated and again immediately re-inserted into the switch fabric as packet 66. The SPE pointer for this packet's frame is increased by another TP to account for the second propagation delay through the switch fabric. The adjusted pointer PTR2 points to time TA+TP+TP, which is first data byte 58" of the SONET frame for this second egress port.

SONET Envelope Pointer Adjusted for Modulus of Frame Size—FIG. 6

The SPE pointer cannot be increased without limit. The SPE pointer must point to a starting data byte that is within the current SONET frame. Once the SPE pointer is increased beyond the last byte in the current frame, the SPE pointer must be reduced by the size of one SONET frame to point to a starting byte in the next SONET frame.

Figure 6A:
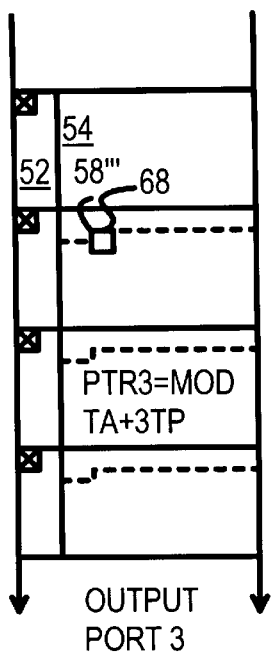
FIG. 6A shows the SPE pointer being adjusted by the modulus of the frame size when the accumulated propagation delays exceed the frame boundary.

FIG. 6A shows the SONET payload envelope pointer being adjusted by the modulus of the frame size when the accumulated propagation delays exceed the frame boundary. When the multicast packet reaches the third egress port, it has accumulated three propagation delays, arriving at time TA+3*TP. The SPE pointer is adjusted again to point to first data byte 58''' at time TA+3*TP. Because packet 68 arrives in the next SONET frame, the SPE pointer is adjusted to point to a byte in the next SONET frame.

The SPE pointer value TA+3*TP is adjusted by the modulo of the SONET frame size, 810 bytes. For example, when TA+3*TP is 1010 bytes, the SPE pointer is adjusted to 1010–810, or 200 bytes. The third egress port thus outputs the multicast packet in the next SONET frame rather than in the current SONET frame.

The SPE pointer is preferably adjusted by an expected maximum-predefined propagation delay through the switch fabric, rather than by the actual propagation delay of each packet. If the packet arrives early at the next egress node, it is held at the egress node and not output nor forwarded until the time specified by the adjusted pointer.

Note that in conventional SONET systems the pointer is adjusted to match the latency and timing of the data. In this method, the pointer is pre-adjusted a fixed amount and the data is adjusted (delayed) until its timing matches the pre-adjusted SONET pointer.

Figure 6B:
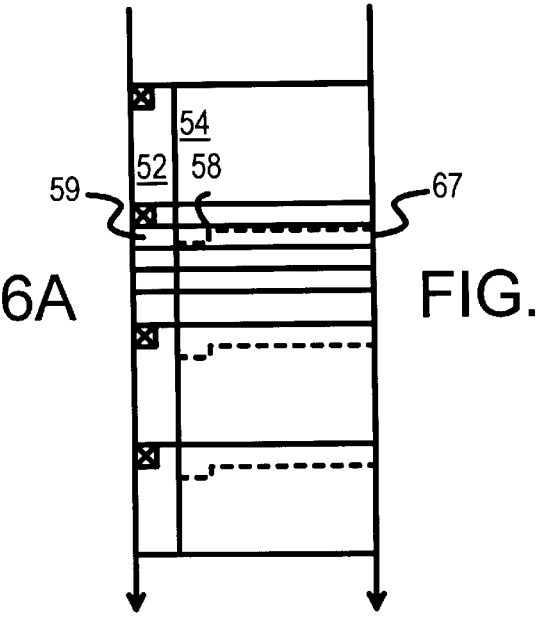
FIG. 6B shows row-based packets.

FIG. 6B shows row-based packets. In a preferred embodiment, the SONET frames are divided into packets along row boundaries. For a SONET frame with 810 bytes arranged in 9 rows, 9 packets are generated for each SONET frame: one 90-byte packet for each row.

A packet can overlap two SPEs and contain SONET frame overhead data. In FIG. 6B, the SPE pointer points to a byte within the second row of the frame. This second row 67 becomes the payload of an internal packet that is sent through the switch fabric. The first three bytes 59 contain overhead data. Data bytes within second row 67 that are before first data byte 58 indicated by the SPE pointer are included in this packet. Since first SPE data byte 58 is in the second row of the frame, the first row within the frame is a packet for the previous SONET SPE.

Figure 7:
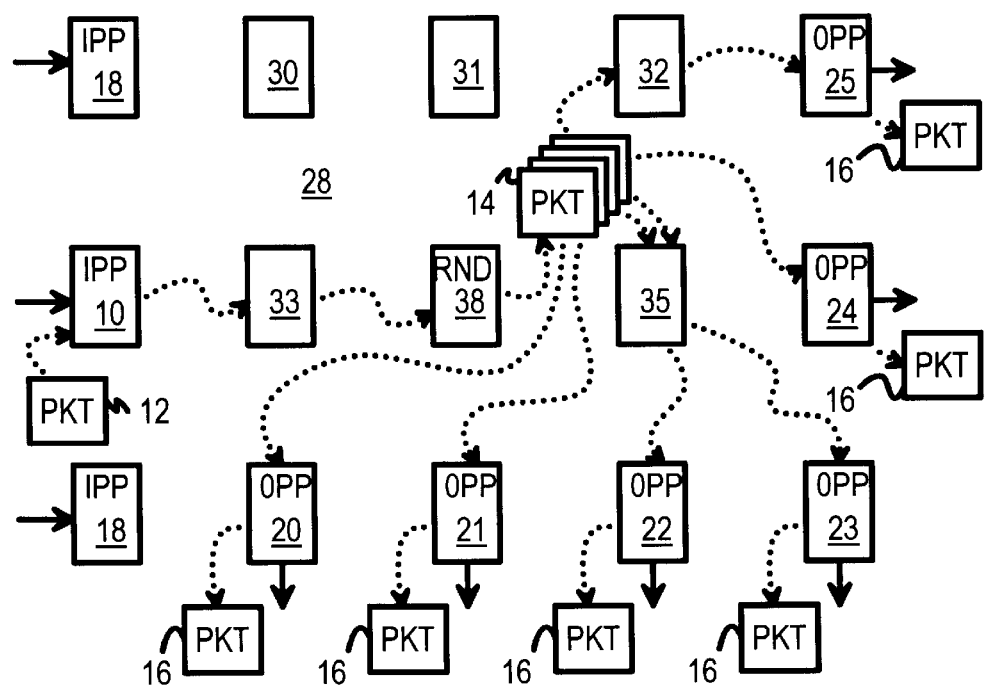
FIG. 7 highlights parallel multicast by packet replication at a random node in a switch fabric.

Parallel Multicast Replication at Random Nodes—FIG. 7

FIG. 7 highlights parallel multicast by packet replication at a random node in a switch fabric. A related application by the applicant, "Adaptive Fault-Tolerant Switching Network With Random Initial Routing and Random Routing Around Faults", U.S. Ser. No. 09/470,144, assigned to Corvia Networks of Sunnyvale Calif., disclosed initially routing packets to a randomly-selected node in the switch fabric, then routing packets toward their actual destination egress port. Since different random nodes are selected for each packet, packet traffic is spread out within the switch fabric, eliminating local congestion.

Switch fabric 28 contains store-and-forward switches at nodes within the fabric. The fabric is preferably isotropic so that there is no unique directionality. Each node is directly or indirectly connected to every other node so that the nodes are generally indistinguishable except for the node's unique switch address and the input or output ports connected to the node.

Replicating a multicast packet at the ingress port causes local congestion. To avoid this congestion, multicast packet 12 is sent from ingress port 10 to random node 38 before replication. Random node 38 is a randomly-selected intermediate node within switch fabric 28. A different random node is selected at random for each multicast packet, so that multicast packets are randomly distributed throughout switch fabric 28. This distribution of multicast packets prior to replication spreads out packet traffic and eases congestion and reduces the probability of blocking.

Multicast packet 12 is initially routed from ingress port 10 through intermediate node 33 to random node 38. Random node 38 replicates multicast packet 12, producing multiple copies 14 of packet 12. Multiple copies 14 are each unicast packets sent to a single destination address, one of egress ports 20–25. For example, egress ports 22, 23 are reached through intermediate node 35, while other egress ports 20, 21, 24, 25 can be reached directly from random node 38. Packet 16 is output from each egress port 20–25.

Header Replication—FIGS. 8A–D

Figure 8A:
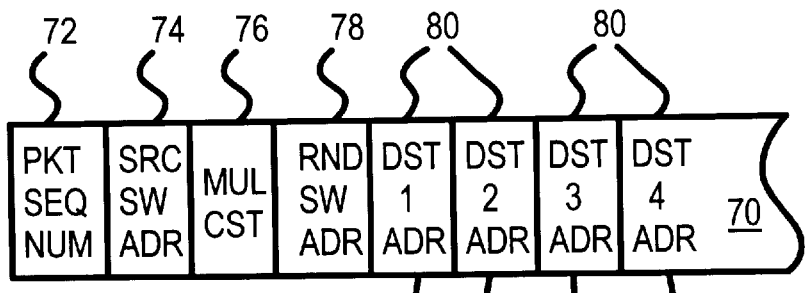
FIGS. 8A–D show a multicast packet header that is duplicated to form several unicast packets at a random node.

FIGS. 8A–D show a multicast packet header that is duplicated to form several unicast packets at a random node. In FIG. 8A, the header of parallel multicast packet 70 is shown. The header includes sequence number 72 that indicates the order of the packet. For example, a SONET frame received from an external optical link has 9 rows of 90 bytes per row. The SONET frame can be divided into 9 packets, each with a data payload of 90 bytes. These 9 packets can be assigned sequence numbers that correspond to their row order. The data payload follows header 70 in FIG. 8A. The header 70 shown is attached to each packet by the ingress port and removed by the egress port.

Source address field 74 contains a switch address of the ingress port that inserts the packet into the switch fabric. This address is a local, internal address that identifies the node with the ingress port. For example, the switch fabric may contain 1,000 nodes, each assigned an address from 0–999. Each node is a store-and-forward switch and can have one ingress port and one egress port attached, as well as function as an intermediate node.

Multicast bit 76 is set to indicate that the packet is a multicast packet with several destination egress ports within the switch fabric. Multicast bit 76 is cleared to indicate a unicast packet that has just one destination egress port.

Random field 78 contains the internal switch address of the random node. This address is randomly generated by the ingress port for a parallel multicast packet. Each of the 9 packets from a SONET frame is assigned to different random nodes to disperse congestion within the switch fabric.

Destination fields 80 contain switch addresses of egress ports that the multicast packet is being sent to. For a unicast packet, only one destination address field 80 is used in the header. Multicast packets can have many destination address fields 80.

The switch addresses in fields 74, 78, 80 preferably use the same addressing scheme, such as a number from 0 to 999 in a thousand-node fabric. Each node in the switch fabric is assigned one address. This node's address can be a source, destination, or random address, depending on the packet's route. This node's switch address is written to source address field 74 when the packet is inserted from an ingress port attached to the node. The same switch address is written to random field 78 when the switch is an internal node randomly assigned by another ingress port. The same switch address is written to one of the destination address fields 80 when the node is attached to the egress port that the packet is routed to.

Each node compares its switch address to the address in random field 78. When the addresses match, the node is the random node and must do further processing rather than simply store and forward the packet. When multicast bit 76 is set, packet replication is performed by the node. When a multicast packet with header 70 of FIG. 8A arrives at a node with a switch address that matches the address in random field 78, the packet and its header 70 are stored in the node's local memory. The node then replicates the multicast packet into several unicast packets and removes the original multicast packet. The unicast packets are then forwarded to their destinations.

Figure 8B:
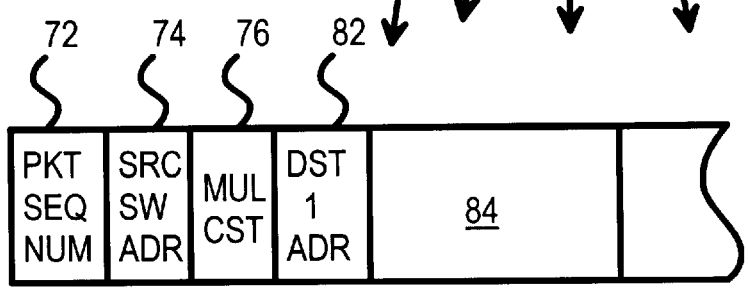
Figure 8C:
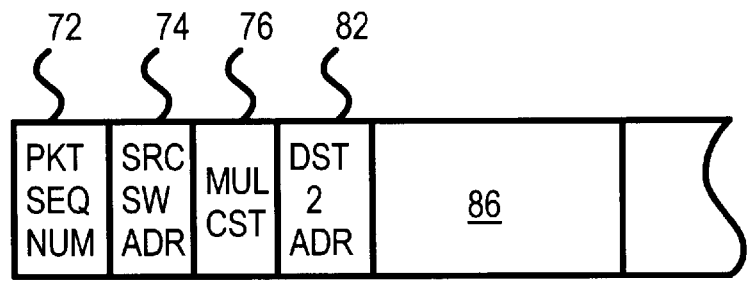
Figure 8D:
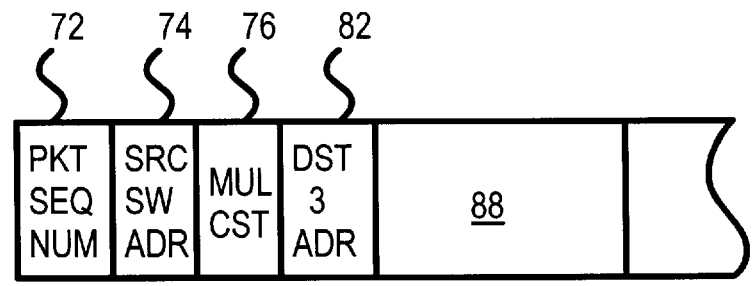

FIGS. 8B–D show three unicast packets that are generated by a random node from the multicast packet of FIG. 8A. Multicast bit 76 of FIG. 8A is set, but multicast bit in FIGS. 8B–D is cleared so that the multicast packet is replicated to three unicast packets. The sequence number 72 and source address field 74 from the multicast packet header 70 (FIG. 8A) are copied to each of the replicated packet's headers 84, 86, 88 (FIGS. 8B,C,D).

Each unicast packet header 84, 86, 88 contains just one destination address 82. In FIG. 8B, header 84 contains as destination address 82 the first destination address from destination address fields 80 of multicast packet header 70 (FIG. 8A). In FIG. 8C, header 86 contains as destination address 82 the second destination address from destination address fields 80 of multicast packet header 70 (FIG. 8A). In FIG. 8D, header 88 contains as destination address 82 the third destination address from destination address fields 80 of multicast packet header 70.

Thus the destination addresses from the multicast packet header are copied to a single destination address field in each of multiple unicast packets. The multicast bit set in the multicast packet received by the random node is cleared in the replicated unicast packets.

This method is flexible, allowing multicast to any nodes in the fabric. Management is relatively easy, and can be applied to any switch-fabric network size or configuration. The method is most useful when the multicast is to a limited number of egress ports. However, as the number of egress port destinations increase, the multicast header 70 must grow in length to accommodate storage of all the destination switch addresses. A fixed header size effectively limits the number of destination egress ports for the multicast packet. A variable header size removes this limit, but adds complexity to the system.

Figure 9:
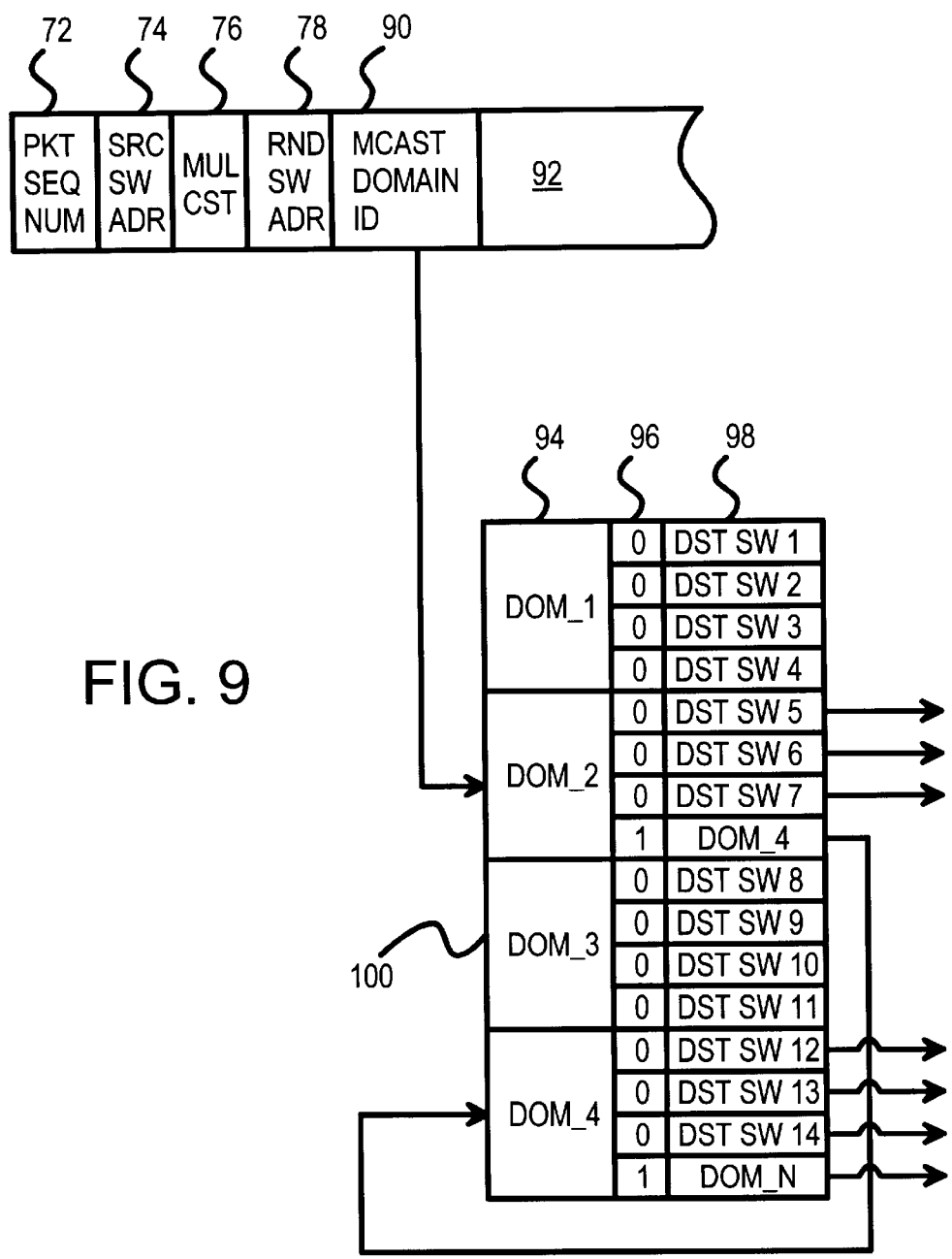
FIG. 9 shows a multicast packet header with a domain ID that selects a list of destination addresses stored in a table at the random node.

Multicast Domains—FIG. 9

FIG. 9 shows a multicast packet header with a domain ID that selects a list of destination addresses stored in a table at the random node. When a multicast packet is sent to a large number of destination egress ports, a multicast domain identifier (ID) can be written to the packet header. Instead of storing each of many destination switch addresses in the multicast header, a single number can be stored in the multicast header. This single number is a multicast domain identifier that identifies a pre-defined list of destination egress ports. Thus one identifier rather than many addresses are stored in the multicast packet.

Multicast packet header 92 contains sequence number 72, source address field 74, and random field 78 as described for FIG. 8A. Multicast bit 76 is set since this is a multicast packet received by the random node whose switch address matches that in random field 78.

Rather than store many destination addresses for many egress ports in header 92, a single number, the multicast domain ID, is stored in multicast domain field 90. This multicast domain ID is used as a pointer into lookup table 100 stored at the random node. Each random node has its own local copy of lookup table 100.

Lookup table 100 has domain entries defined by domain field 94. The domain identifier from multicast domain field 90 in packet header 92 is compared to domain identifiers in domain field 94 in lookup table 100 to find a matching domain entry. Then all the addresses in address field 98 for the matching domain are read out of lookup table 100.

For example, when multicast domain field 90 is domain 2, domain 2's entry in lookup table 100 is selected, and switch addresses 5, 6, 7 are output. Three unicast packets are generated by the random node. The switch addresses from address field 98 of lookup table 100 are written as destination switch addresses 82 written to the three unicast packets of FIGS. 8B,C,D. These 3 unicast packets are then routed to three different egress ports.

The domains in lookup table 100 can be nested to form a linked-list structure. In the example of domain 2, the last entry in address field 98 is not an egress-port address. Instead, the address in address field 98 is another domain identifier. This domain identifier, DOM_4, is used to find domain 4 in lookup table 100. Domain 4 contains additional destination addresses for switches 12, 13, 14. These additional destination addresses are used to generate 3 more unicast packets to egress ports at nodes for these three addresses in address field 98.

Domain 4 also contains another domain identifier as the last address field 98. This provides a link to still another domain, DOM_N. Many additional destination address can be retrieved from lookup table 100 using such linking.

Domain flag bit 96 is stored with each address field 98. Domain flag bit 96 is cleared (zero) for address entries that are absolute switch addresses. These entries are used by the random node to generate a unicast packet. When domain flag bit 96 is set (one), the entry in address field 98 is not a switch address, but instead is a domain identifier that links to another domain of destination addresses.

Nested Domains to Other Random Nodes

Rather than recursively look up domains in the same lookup table 100 at the current random node, a new multicast packet can be generated from domain entries. When domain flag bit 96 is set, the current random node generates a new multicast packet with the multicast bit set, and the domain stored in address field 98 written as the multicast domain field 90 of the new multicast packet. Another random address is generated and written to random field 78, and the new multicast packet is sent from the current random node to the new random node indicated in random field 78.

At the new (second) random node, the new multicast packet is received and processed as described before. The domain identifier in the new multicast packet is used to locate the domain entry in the lookup table 100 at the new random node. Additional unicast packets are generated from the address entries in lookup table 100 at the new random node. These additional unicast packets are sent out by the new (second) random node to their egress ports. Thus both the first and the second random nodes generate and send out unicast packets. This reduces local congestion around the first random node since fewer unicast packets are sent out from that node.

Each intermediate node that can be a random node has its own local copy of lookup table 100 with the same information. This requires some centralized table management for the entire switch fabric to ensure that all random nodes have a current list of domains and egress ports assigned to each domain. Also, the multicast domains must be pre-defined. This limits multicast to using these pre-defined domains of egress ports rather than any arbitrary group of egress ports. Additional local memory at each node may be required to store the lookup table 100. However, nesting can reduce local congestion at the random node, and large multicast domains can be used to multicast to many egress ports.

Figure 10:
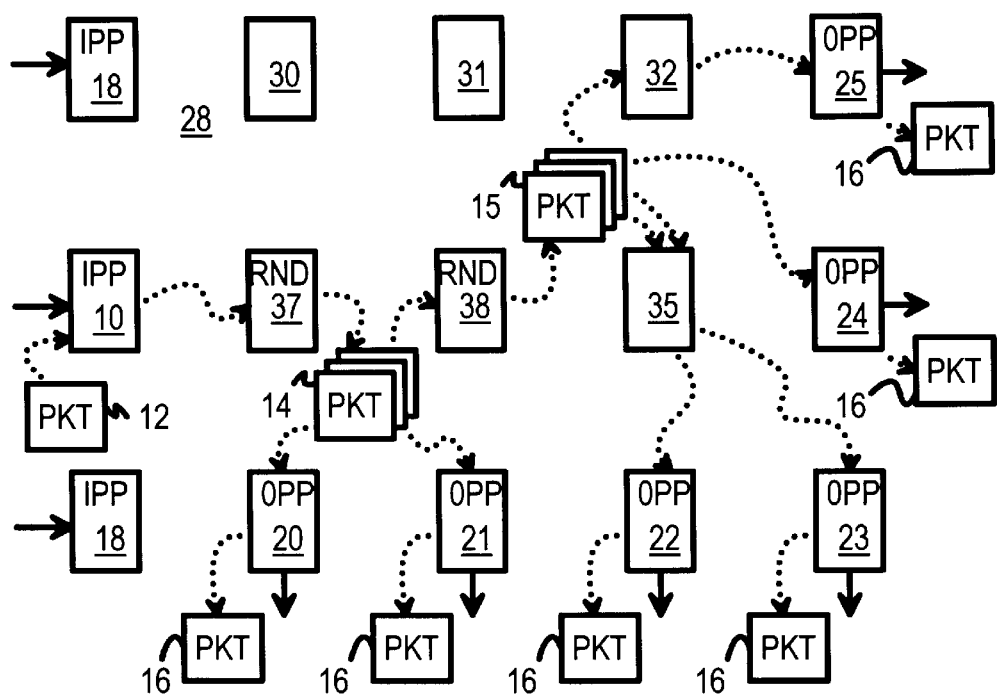
FIG. 10 shows parallel multicast with nested random node routing.

Nested Parallel Multicast—FIG. 10

FIG. 10 shows parallel multicast with nested random node routing. Multicast packet 12 is injected into switch fabric 28 by ingress port 10 and is routed to random node 37. Random node 37 replicates multicast packet 12 to generate multiple copies 14 of the multicast packet. Some of these multiple copies are unicast packets 16 that are routed to egress ports 20, 21 and output to external network links connected to egress ports 20, 21.

At least one of the multiple copies 14 generated by random node 37 is another multicast packet that is sent to another random node 38. Random node 37 is selected at random by ingress port 10, while random node 38 is randomly selected by random node 37 when multiple copies 14 are generated.

Random node 38 then generates additional multiple copies 15 of the multicast packet received from random node 37. These additional multiple copies 15 are unicast packets containing the data from multicast packet 12. Each of these additional multiple copies 15 are routed as packet 16 to one egress port 22–25. For example, two packets 16 are routed to egress ports 22, 23 through intermediate node 35, while another packet 16 is routed directly to egress port 24 and another packet 16 is routed to egress port 25 through intermediate node 32.

Nesting of packet replication at different randomly-selected intermediate nodes has the effect of spreading out the multicast packets over several nodes within switch fabric 28. Congestion is reduced since fewer packets need to be created at any given node. Blocking probability is reduced significantly.

This method is a combination of the serial, drop-and-continue method and the parallel random-node packet replication. Rather than drop-and-continue at egress ports, replication is performed at the random nodes. Any combination of unicast packets sent to egress ports and multicast packets sent to other random nodes can be used.

Figure 11:
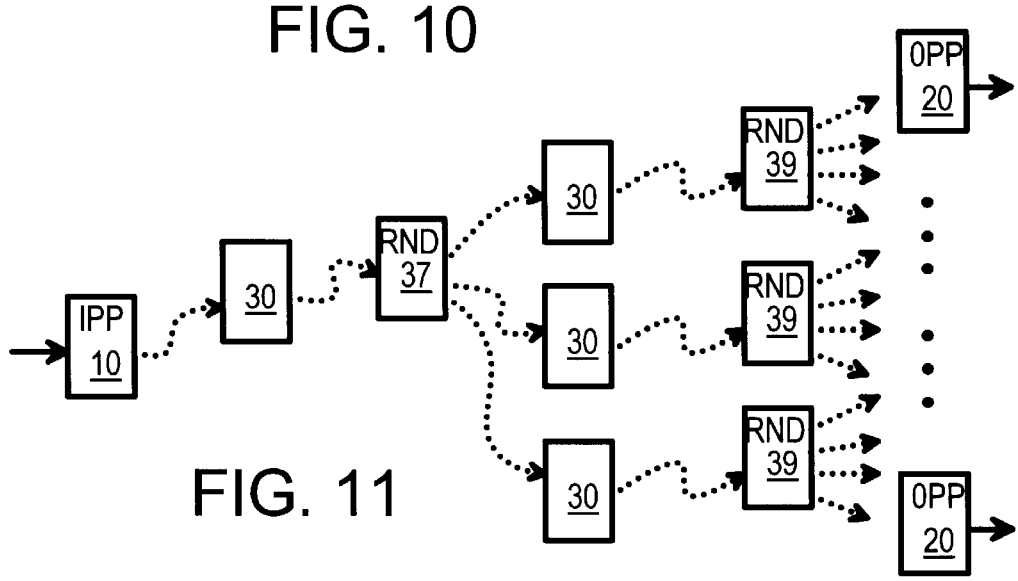
FIG. 11 highlights that multiple nesting of packet replication can produce chain-reaction multicasting.

FIG. 11 highlights that multiple nesting of packet replication can produce chain-reaction multicasting. A multicast packet inserted by ingress port 10 is sent to first random node 37 through intermediate node 30. The multicast packet is replicated at random node 37 to produce multiple copies of the packet. These multiple copies are multicast packets rather than unicast packets and are routed through other intermediate nodes 30 to second-level random nodes 39. Second-level random nodes 39 each generate additional multiple copies of the multicast packet, but these copies are unicast packets directed to egress ports 20.

A single multicast packet can be replicated and sent to many egress ports using chain multicasting, since the number of replicated packets can increase geometrically with each additional level of random nodes.

Serial Techniques Reduce Latency Buildup

Latency can build up when using a chained parallel multicast scheme. Each additional random node in the chain adds a propagation delay to the packet's arrival time at the final egress port. When three or four levels of random nodes are used to replicate packets, four or more average propagation delays occur before the packet reaches the final egress port. The total delay may be greater than a SONET frame period, causing data loss.

Packet replication can be synchronized to the SONET frames. This combination of serial and parallel multicast techniques has each random node hold its replicated packets until the beginning of the next SONET frame. The replicated packets are then re-inserted into the switch fabric at the start of then next SONET frame and have almost the whole frame period to reach their egress ports. Each level of random nodes can hold packets for the next SONET frame, or only every second level of random nodes can hold packets.

The serial multicast method that advances the SPE pointer can also be used with chain parallel multicast. Each level of random nodes increases the SONET payload envelope (SPE) pointer by the maximum propagation delay. When the pointer advances past the last byte of the frame, the pointer wraps back to the first byte of the next frame using modulo addition. Unicast packets dispatched from the second level of random nodes have a more advanced pointer than packets dispatched from the first level of random nodes.

ADVANTAGES OF THE INVENTION

Multicast of packets is performed in a packet-based switch. Latency and variable propagation delays are accommodated for serial and chain-parallel multicast. Reduced congestion and traffic for parallel multicast is achieved. Multicast is performed in a mesh-based network switch that emulates a SONET time-division-multiplexed (TDM). The probability of blocking and packet loss from congestion is reduced during multicast. Fault tolerance during serial multicast is achieved.

Parallel multicast has the advantage that many egress ports can receive the multicast packet, especially when a look-up table is used at the random node performing packet replication. Congestion at the ingress port is eliminated since just one copy of each multicast packet is inserted into the fabric at the ingress port. Dispersing the multicast packets to different, randomly-selected nodes spreads the packet traffic out within the fabric. Packet replication does not occur until after this random dispersion. Thus locally congested areas in the fabric are avoided, since packet replication is dispersed.

The same network switch can use different multicast methods depending on the multicast application. For example, port monitoring may simply replicate all packets sent to one egress port to a second egress port. A simple serial multicast that drops each packet at the first egress port, replicates the packet, and sends it to the second egress port may be used.

A broadcast application that sends a video feed or a system status or command to all egress ports may use a chain parallel multicast. Each multicast packet is sent to a different random node, where limited replication occurs. The replicated packets are sent to a second-level of random nodes, where further replication occurs. After a few more levels of replication, enough packets are generated to be sent to all egress ports. The replication at each level of random nodes may be delayed until the next SONET frame when many levels of replication are needed, but not held up when few levels are required. Fault tolerance is achieved in parallel or chain parallel multicast as compared to serial multicast in that a defective node will not break the chain. If a random node is faulty, a new random destination is chosen as described in the related application, "Adaptive Fault-Tolerant Switching Network With Random Initial Routing and Random Routing Around Faults", U.S. Ser. No. 09/470,144, assigned to Corvia Networks of Sunnyvale, Calif.

ALTERNATE EMBODIMENTS

Several other embodiments are contemplated by the inventors. For serial multicast in a switch fabric with short propagation delays, the multicast packet could be allowed to travel to two or more egress ports before being held up for the next insertion time. For example, if the propagation delay were less than half the SONET frame period, the first egress port could immediately release the replicated multicast packet to the second egress port. The second egress port then holds the packet until the insertion time of the next SONET frame. Thus the multicast packet is held for every even egress port but not for every odd egress port. The serial multicast packet can first be sent to a random node prior to being sent to each next egress node. Thus egress ports are separated by random nodes.

The packet header for serial multicast can contain a list of egress ports. As each egress port is reached, the current egress port's address can be removed from the list in the replicated packet that is re-inserted. Alternately, a pointer in the header can point to the next egress port to route the packet to, or valid bits can be associated with each egress-port address in the header. The valid bits are cleared as each egress port is reached. When one of the egress ports is unintentionally passed over when the multicast packet is being routed to a different egress port, the valid bit for that port can be cleared and the packet replicated.

To prevent fabric over-subscription during serial multicast, typically only the ingress port and the last of the egress ports (the terminal destination) are allowed to act as ingress ports. The other ports are not allowed to input packets received from external networks.

When the multicast packet is sent to all egress ports, a broadcast function is performed. Thus broadcast is a special case of multicast. Rather than store just one domain ID in the header, two or more domain IDs can be stored in the header as two or more separate numbers. Each domain ID can be looked up in the node's local table, each causing packet replication to packets destined for different egress ports. Rather than store the domain ID in the lookup table and perform an associative table search, the domain ID can be an address that directly locates the domain's entry in the table. A domain tag can also be used to partially match the domain ID. Of course, other encodings can be used in the lookup table, such as inverse bits that are cleared to one and set to zero. Another bit in the multicast packet header can be used to distinguish whether the packet's header contains multicast domain identifiers or destination addresses.

Rather than allow any node in the switch fabric to be used as the random node, the random node can be selected from a subset of all the nodes. Different ingress ports could be allowed to select a random node from different subsets of intermediate nodes. Domain lookup tables could be stored only at nodes within the subset rather than at all intermediate nodes. Packet replication is then allowed only at this subset of nodes.

The communication links among nodes and switches can be implemented in a variety of ways and in different technologies. The packet buffers/memory of each node switch may be implemented as either shared memory or distributed memory. Distributed memory could be implemented as a collection of memory blocks, where one or more memory blocks are associated with an input port. Many technologies can be used to implement the memory. Node switches can have several ports each, or no ports, or any combination of N ingress and M egress ports.

The random node switch can be any switch in the network, or can be randomly chosen from a subset of the switches in the network, such as all switches that are 2 hops or less away from the source switch. The random switch could also be restricted to the adjacent switches (one hop). The random switch could be selected from all switches in the network, including the source or destination switches, or from all switches except the source and destination switches. Packets may be re-randomized by being deflected to another switch, such as being sent to an adjacent switch, before the random address is generated.

The packet header may be appended to the end of the packet rather than precede the data in the packet. The packet and header could be stored separately in the node's packet memory, or in separate memories. For example, the header could be stored in a higher speed memory. Rather than explicitly write the random address to a separate field in the header, the random address could be implicitly stored in the header. The random address could be generated from other fields in the header, such as by a bit hashing of a sequence number, source and destination address fields. If a timestamp is generated for any reason, such as to be included in a packet header, the timestamp could be used to generate the random number. A local lookup table in each switch could also be used to generate all or part of the random address.

The flag or multicast indicator can be set to either a one or a zero, depending on the logic polarity. Rather than use a one-bit flag, multicast can be encoded into other fields of the header.

The exact timing of packet storage and routing lookup can be varied and overlap. For example, the header can be read from the packet as it is received, and the header's addresses looked up in the node's routing table. The packet may be physically stored in the node's packet memory either before or after the route has been determined. Regarding store-and-forward data switching, the routing algorithms could be independent to the data switching mechanism. The data switching mechanism could be either store-and-forward, virtual cut-through, or wormhole.

The isotropic mesh of the switch fabric may be a multi-dimensional network. A multi-dimensional network implies that the number of nodes along each dimension could differ. In addition, the topology used to connect nodes along each dimension could differ. Many other topologies may be substituted. "One-dimensional" topologies with various connectivity patterns among nodes such as chordal rings and circulant graphs can be used. Isotropic meshes of various kinds can be used.

The random node switch can be selected by any of a variety of scattering functions, such as pseudo-random, round-robin address cycling, or true random selection. The term "random" can apply to such scattering functions that disperse traffic among many nodes during the initial routing. The random switch is chosen in a "random" manner in the sense that it is random with respect to the source and destination. Random routing could also be implemented piecemeal, with the packet being randomly deflected at each switch for a period of time. When a phase timeout occurs for the packet, the switch where the packet is at becomes the random switch, and the packet enters a next routing phase. The scattering function may also select switches from a limited universe of switches less than the complete set. This could be done because of non-uniform network properties or to reduce link utilization. For example, to reduce link utilization scattering could be a function of the ingress and egress ports relative location, such as being constrained to a maximum number of hops for the entire journey from ingress to egress ports, including going to the random switch.

Of course, the packet can immediately end its routing if it unintentionally passes over the destination switch before the random node is reached. For a multicast packet, when a node being passed through matches one of the destination addresses in the header, the matching address can be removed and the packet replicated for output by that node. All switches can check the packet header for destination addresses at all times to detect this situation. Other special cases can occur during normal operation. The inventions described herein need not be limited to networks that emulate circuit switching. They can also be applied to conventional packet switching networks that do not have a one-to-one ingress to egress traffic pattern.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A mesh-based packet switch with multicast capability comprising:

a plurality of ingress ports for receiving data and generating packets including multicast packets;

a plurality of egress ports for transmitting data from the packet switch;

a switch fabric having a plurality of switching nodes each for storing and forwarding packets within the switch fabric, the switching nodes including input nodes coupled to ingress ports in the plurality of ingress ports and output nodes coupled to egress ports in the plurality of egress ports;

wherein an ingress port injecting a multicast packet generates a multicast header to attach to the multicast packet, the multicast header including:

a multicast flag indicating that the multicast packet is a packet being sent to many egress ports;

a random field for storing an address of a random node within the switch fabric; and a multicast destination identifier for indicating which egress ports to send the multicast packet to;

wherein the multicast packet is initially routed to the random node before packet replication;

wherein the random node stores the multicast packet sent from the ingress port, the random node replicating the multicast packet to generate a plurality of unicast packets, the unicast packets each having a header including:

a destination field for storing a destination address of an output node coupled to an egress port identified by the multicast destination identifier of the multicast packet received by the random node;

wherein the switching nodes route the unicast packets from the random node to the output nodes identified by the destination fields of the unicast packets generated by the random node;

wherein the random node is selected at random from all the switching nodes in the switch fabric, whereby multicast packets are initially dispersed to randomly-selected nodes within the switch fabric before packet replication and whereby congestion at the input node is reduced by replicating the multicast packet at the random node.

2. The mesh-based packet switch of claim 1 wherein the multicast destination identifier comprises a list of the destination addresses.

3. The mesh-based packet switch of claim 1 wherein the random node further comprises:

a lookup table, indexed by the multicast destination identifier from the multicast packet, for storing the destination addresses written to the headers of the unicast packets generated by the random node, whereby destination addresses for the multicast packet from the ingress port are locally stored at the random node.

4. The mesh-based packet switch of claim 3 wherein the lookup table further stores second-level multicast identifiers, the second-level multicast identifiers for indexing the lookup table to locate a second group of destination addresses;

wherein the random node further generates a second multicast packet with a second multicast header that includes a second random field storing an address of a second random node within the switch fabric, the second multicast header storing a second-level multicast identifier from the lookup table;

wherein the second multicast packet is routed from the random node to the second random node by switching nodes in the switch fabric;

wherein the second random node replicates the second multicast packet to generate unicast packets, the unicast packets each having a header including a destination field read from a second lookup table at the second random node, whereby nested packet replication occurs at two random nodes.

5. The mesh-based packet switch of claim 4 wherein data received by the ingress port is arranged in a Synchronous Optical NETwork (SONET) frame;

wherein packet replication by the random node and by the second random node is synchronized to the SONET frame.

6. The mesh-based packet switch of claim 1 wherein the address of a random node within the switch fabric is randomly generated by a dispersion function to select as the random node any switching node from any set of switching nodes in the switch fabric, including switching nodes that are not on a route to the output node;

wherein the dispersion function is random with respect to the output node, wherein the random node is selected by the dispersion function selected from the group consisting of a pseudo-random selector, a true-random selector, and a round-robin cycler, whereby packets are first routed to a random node and replicated at the random node before being routed to their output node.

7. The mesh-based packet switch of claim 6 wherein the switch fabric is an isotropic mesh.

8. The mesh-based packet switch of claim 6 wherein data received by the ingress port is arranged in a Synchronous Optical NETwork (SONET) frame;

wherein the ingress port also injects a serial multicast packet into the switch fabric, the serial multicast packet having a serial header attached to the serial multicast packet by the ingress port, the serial header including:

a multicast flag indicating that the multicast packet is a packet being sent to many egress ports; and a multicast destination identifier for indicating which egress ports to send the multicast packet to;

wherein the serial multicast packet is routed by the switching nodes to a first egress port indicated by the multicast destination identifier;

wherein the first egress port replicates and outputs data from within the serial multicast packet;

wherein the first egress port sends the serial multicast packet to a second egress port indicated by the multicast destination identifier;

wherein the second egress port replicates and outputs data from within the serial multicast packet;

wherein the second egress port sends the serial multicast packet to a third egress port indicated by the multicast destination identifier;

wherein the third egress port replicates and outputs data from within the serial multicast packet, whereby serial multicast packets are routed to a chain of egress ports for replication at the egress ports.

9. The mesh-based packet switch of claim 8 wherein each egress port indicated by the multicast destination identifier re-injects the serial multicast packet into the switch fabric after a start of a next SONET frame, wherein a latency of one SONET frame period is added for each egress port that re-injects the serial multicast packet into the switch fabric, whereby latency build-up within a SONET frame is eliminated.

10. The mesh-based packet switch of claim 8 wherein each egress port indicated by the multicast destination identifier adjusts a synchronous payload envelope (SPE) pointer by a predetermined fixed amount for data output by that egress port, the SPE pointer for indicating a location of a first data byte within a SONET frame;

wherein each egress port indicated by the multicast destination identifier re-injects the serial multicast packet into the switch fabric;

whereby latency build-up within a SONET frame is eliminated.

11. The mesh-based packet switch of claim 10 wherein the SPE pointer is advanced by a propagation delay for the serial multicast packet through the switch fabric, whereby the SPE pointer is advanced by a switch-fabric propagation delay.

12. The mesh-based packet switch of claim 8 wherein the serial multicast packet is first sent to the random node prior to being sent to the first egress port, and wherein the serial multicast packet is sent from the first egress port to a second random node prior to being sent to the second egress port, whereby the serial multicast packet is routed through random nodes.

13. A multicasting packet switch comprising:
a switch fabric containing a plurality of switch node means each for routing packets within the switch fabric;
ingress means, coupled to switch node means in the switch fabric, for receiving and packetizing data from an external source;
egress means, coupled to switch node means in the switch fabric, for receiving packets sent through the switch fabric and for arranging in sequence order packets before transmission to an external destination;
multicast means, coupled to the ingress means, for generating a multicast packet that includes a destination identifier that identifies a series of egress means to receive the multicast packet;
wherein each egress means that receives and re-injects the multicast packet includes:
duplication means, receiving the multicast packet, for duplicating data from the multicast packet for transmission to the external destination;
re-injection means, receiving the multicast packet, for re-injecting the multicast packet into the switch fabric for routing to another of the egress means identified by the destination identifier; and
timing means, coupled to the re-injection means, for re-injecting the multicast packet after a start of a next Synchronous Optical NETwork (SONET) frame,
whereby latency buildup within a SONET frame period is avoided during multicast.

14. The multicasting packet switch of claim 13 further comprising:
parallel multicast means, coupled to the ingress means, for generating a parallel multicast packet that includes a destination identifier that identifies a series of egress means to receive the parallel multicast packet;
scattering means, coupled to the ingress means, for scattering packets in a series of packets to different switch node means within the switch fabric;
wherein each switch node means that receives the parallel multicast packet includes:
replication means, receiving the parallel multicast packet, for duplicating the parallel multicast packet to generate a plurality of unicast packets;
addressing means, coupled to receive the destination identifier from the parallel multicast packet, for generating addresses of egress means identified by the destination identifier and for writing these addresses to destination means in the unicast packets; and
re-injection means, receiving the unicast packet, for re-injecting the unicast packets into the switch fabric for routing to the egress means identified by the destination identifier;
whereby packet replication occurs at switch node means rather than at ingress or egress.

15. The multicasting packet switch of claim 14 wherein the scattering means includes randomizing means for selecting at random from the switch node means in the switch fabric,
whereby multicast packets are randomly scattered within the switch fabric before packet replication.

16. A method for multicasting packets in a mesh-based network comprising:
receiving at an ingress port a data stream for multicasting to a plurality of egress ports;
dividing the data stream into a series of multicast packets;
writing a multicast identifier that identifies the plurality of egress ports in the network to a header for each multicast packet, the multicast packets being sent to each egress port in the plurality of egress ports;
generating an intermediate identifier for an intermediate switch within the network for each multicast packet;
wherein the intermediate identifier is different for each multicast packet in a series of packets;
writing the intermediate identifier for the intermediate switch to the header for each multicast packet;
injecting each multicast packet into the network at a source switch coupled to the ingress port;
routing the multicast packets from the source switch to the intermediate switch identified by the intermediate identifier in the header of each of the multicast packets;
wherein each multicast packet in the series of multicast packets is routed to a different intermediate switch within the network;
at the intermediate switch, replicating the multicast packet to a plurality of replicated packets, the plurality of replicated packets having destinations in the plurality of egress ports identified by the multicast identifier;
routing the plurality of replicated packets from the intermediate switch toward different egress ports in the plurality of express ports; and
re-assembling the data stream from a series of the replicated packets received at each egress port in the plurality of egress ports, each packet in the series of the replicated packets being received from a different intermediate switch;
generating a second multicast packet at the intermediate switch by replicating the multicast packet received from the source switch;
generating a second intermediate identifier for a second intermediate switch;
writing the second intermediate identifier to a header of the second multicast packet
routing the second multicast packets from the intermediate switch to the second intermediate switch identified by the second intermediate identifier in the header of the second multicast packet;
at the second intermediate switch, replicating the second multicast packet to a plurality of second replicated packets, the plurality of second replicated packets having destinations in the plurality of egress ports identified by the multicast identifier;
routing the plurality of second replicated packets from the intermediate switch toward different egress ports in the plurality of egress ports,
wherein the data stream is a Synchronous Optical NETwork (SONET) frame having data arranged into rows;
wherein dividing the data stream into a series of multicast packets comprises forming each row of the SONET frame into a multicast packet;
delaying routing of the second replicated packets until a start of a next SONET frame, whereby latency buildup is avoided by synchronizing multicast packet replication to SONET frame timing.

17. The method of claim 16 further comprising:

using the multicast identifier to locate a matching entry in a lookup table at the intermediate switch;

reading destination addresses from the matching entry in the lookup table;

writing the destination addresses to headers of the replicated packets;

routing the replicated packets to egress ports identified by the destination addresses in the headers read from the lookup table at the intermediate switch, whereby destination addresses of egress ports are read from the lookup table at the intermediate switch.

* * * * *